United States Patent [19]

Baudisch et al.

[11] Patent Number: 4,653,370
[45] Date of Patent: Mar. 31, 1987

[54] ARRANGEMENT FOR DIAGONALLY SHEARING THE END OF A TUBE

[75] Inventors: Hans Baudisch, Lampertheim; Hans Schultheis, Biblis, both of Fed. Rep. of Germany

[73] Assignee: Daimler-Benz Aktiengesellschaft, Fed. Rep. of Germany

[21] Appl. No.: 802,456

[22] Filed: Nov. 27, 1985

[30] Foreign Application Priority Data

Nov. 27, 1985 [DE] Fed. Rep. of Germany ....... 3443197

[51] Int. Cl.⁴ .............................................. B23D 21/02
[52] U.S. Cl. ........................................ 83/456; 83/581; 83/694
[58] Field of Search ................. 83/54, 319, 320, 382, 83/456, 465, 580, 581, 694, 697

[56] References Cited

U.S. PATENT DOCUMENTS

| | | | |
|---|---|---|---|
| 1,161,705 | 11/1915 | Lloyd | 83/694 X |
| 1,230,319 | 6/1917 | Paulson | 83/465 X |
| 2,555,069 | 5/1951 | Verney | 83/694 X |
| 2,741,309 | 4/1956 | Czarnik | 83/319 X |
| 3,143,018 | 8/1964 | Everett | 83/54 X |
| 3,145,462 | 8/1964 | Bognar | 83/54 X |
| 4,457,200 | 7/1984 | Borzym | 83/54 X |

FOREIGN PATENT DOCUMENTS 570461 8/1977 U.S.S.R. ................................. 83/54

Primary Examiner—James M. Meister
Attorney, Agent, or Firm—Barnes & Thornburg

[57] ABSTRACT

An arrangement for diagonally cutting up the end of a rectangular tube is provided. In order to be able to utilize the shearing principle with such diagonal cuts, the clamping jaws are arranged as stationary shearing blades having shearing edges that define a cutting plane. The rectangular tube being cut to size is diagonally inserted between the clamping jaws so that a pocket which is to be cut off stands out beyond the cutting plane. A shearing knife moves along the pocket and has an arrow-like shearing edge which inserts into this pocket-shaped projecting end and cuts off the end from the inside against the stationary cutting blade. Each of the three stationary cutting edges is brushed off by the movable cutting edge by at least one movable component.

16 Claims, 9 Drawing Figures

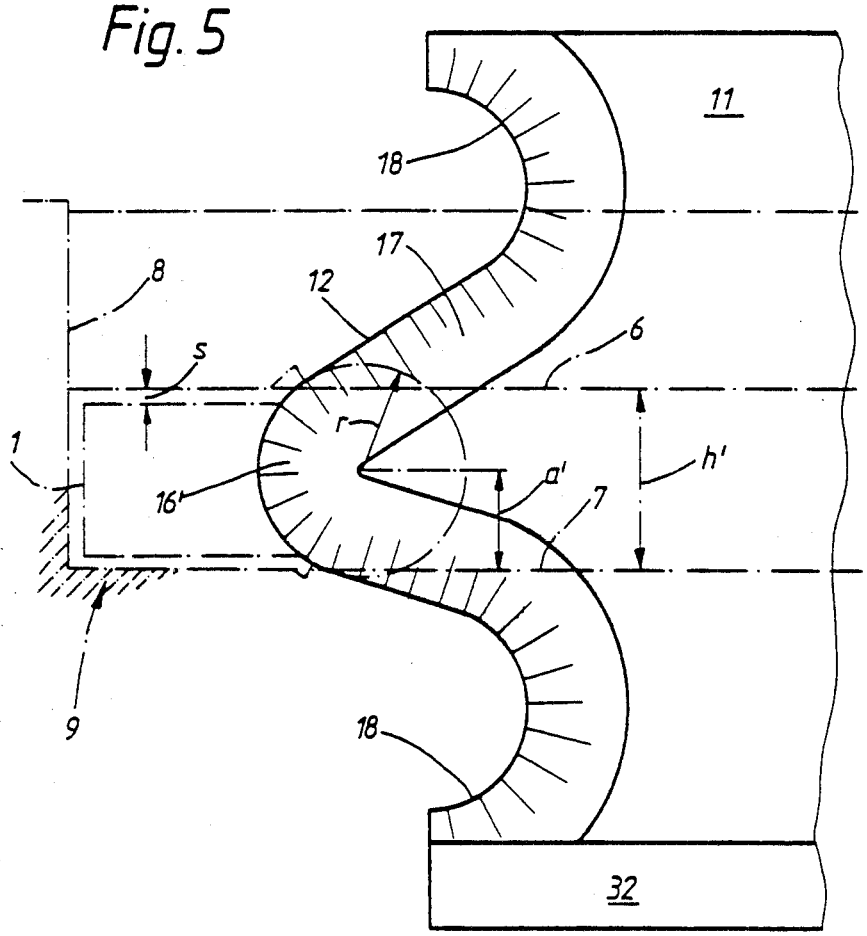
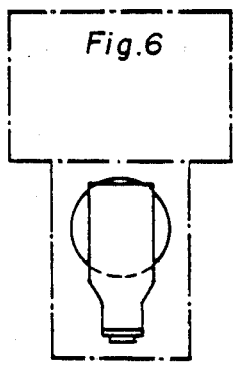

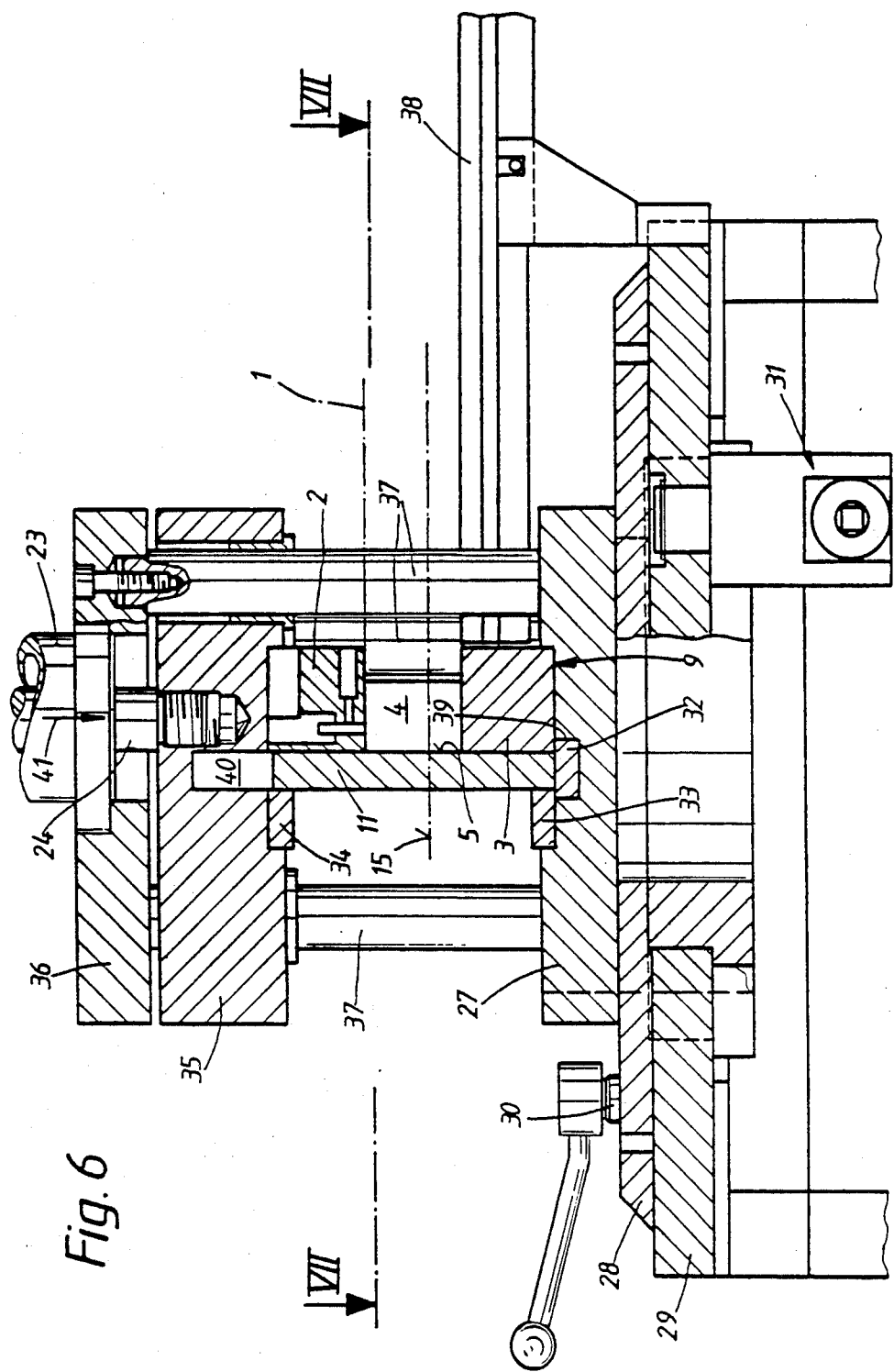

ARRANGEMENT FOR DIAGONALLY SHEARING THE END OF A TUBE

BACKGROUND AND SUMMARY OF THE INVENTION

This invention relates to an arrangement for diagonally shearing the end of a tube according.

U.S. Pat. No. 1,230,319 shows method for miter-cutting a tube. The miter-cutting shears for tubes known from the mentioned patent is intended for circular tubes or oval tubes where the clamping jaws are recessed corresponding to the shape of the tube and corresponding to the miter square. The tube is surrounded over its whole circumference, in which case one front side of the pair of clamping jaws determines the cutting plane in which both front sides must be precisely aligned with one another and in which the movable shearing blade is also guided. When a miter cut is applied, tube sections are used that are cut to length and these are clamped into the clamping device of the cutting means in such a way that the corner to be cut off projects over the cutting plane. The movable cutting tool then moves from the direction of the profile interior into the projecting corner and shears it off against the stationary cutting blade. A disadvantage in this miter-cutting shear arrangement is that the plane of separation of the clamping jaws that are guided with respect to one another by means of a pair of bolts, corresponding to the desired miter square, is in a sloped position with respect to the closing and clamping direction of the clamping jaws. The direction of the movement of the shearing blade is also sloped with respect to the mentioned plane of separation. The unavoidable play in the guiding of the clamping jaws and the clamping force during the clamping of the tube to be beveled, results in a mismatch of the shearing edges at the clamping jaws that may cause an unclean shearing cut or breakage of the shearing edges. In any case, this causes an imprecise guiding of the movable shearing blade with respect to the stationary shearing blade. Another disadvantage is that the known miter-cutting shears for tubes cannot be used universally, i.e., for different shapes of tubes or different miter squares.

These are probably the reasons why the miter-cutting shears known from the text have not proven themselves and have not been widely used in practice. In contrast, as far as the applicant knows, miter cuts on tubes were made only by machining by means of sawing or abrasive cutting. This method is time-consuming, noisy and dirty because of the resulting grinding dust or sawdust. It is only known to the applicant to carry out axially vertical shearing cuts perpendicular to the axis of the tubes in order to cut them to length in a way which takes place rapidly, quietly and without dust. However, when using the known devices for this purpose, a miter cut is not possible.

It is the object of the invention to design a miter-cutting shear device which provides clean miter cuts and a perfect guiding of the movable shearing blade with respect to the stationary shearing blade.

According to the invention, this object is achieved by providing a clamping device with a clamping force direction, transverse to the moving direction of the shearing process. Therefore, as a result, there is no mismatch of the stationary shearing edges caused by play and clamping force. In contrast, the miter square and the clamping force have no effect on the quality of the mutual guiding of the shearing edges with respect to one another, thereby ensuring a clean shearing cut.

Further objects, features and advantages of the present invention will become more apparent from the following description when taken with the accompanying drawings which show, for purposes of illustration only, embodiments in accordance with the present invention.

BRIEF DESCRIPTION OF THE DRAWINGS

FIG. 5 is a side view of another embodiment of the movable shearing blade;

FIG. 6 is a side cross-sectional view of the shearing device arrangement;

FIG. 8 is a representation of the mutual arrangement of FIGS. 6 and 7.

DETAILED DESCRIPTION OF THE DRAWINGS

Figure 1:
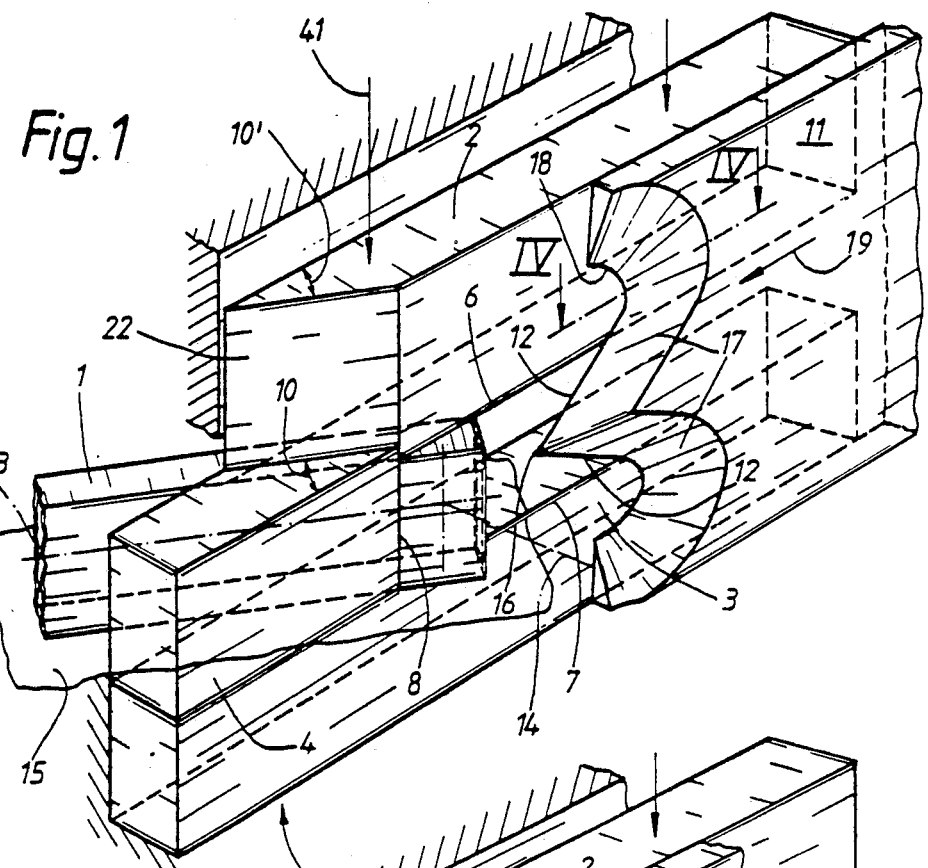
FIG. 1 is a prospective view of the clamping device and movable shearing means prior to the shearing of a tube.
Figure 2:
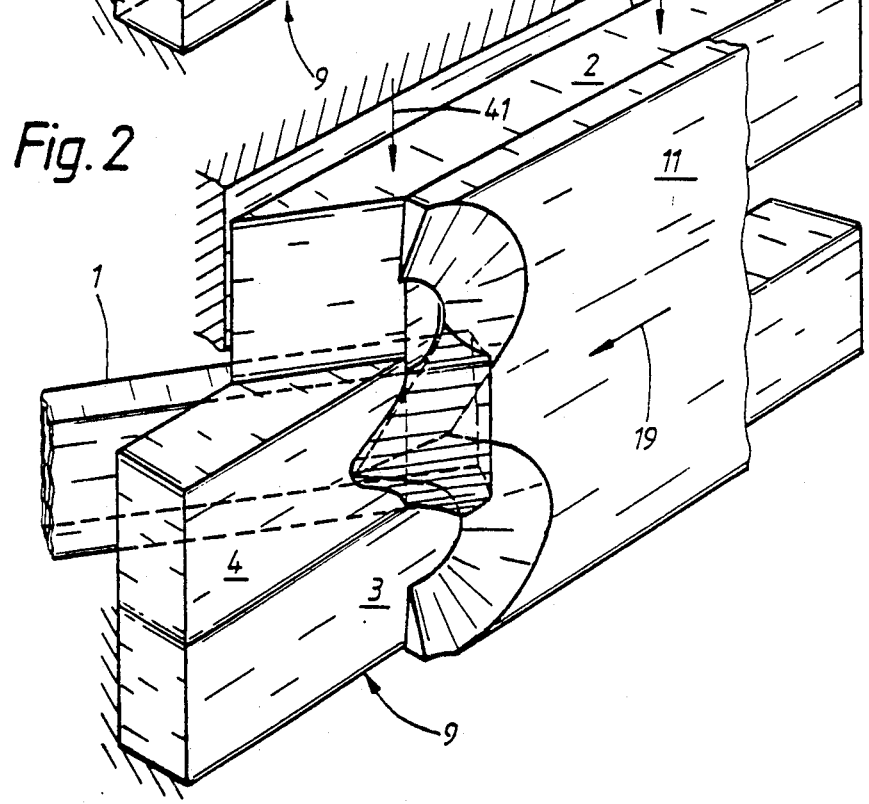
FIG. 2 is a prospective view of the clamping device and movable shearing means shearing the tube.

The important part of the cutting arrangement is the development and mutual arrangement of the stationary and the movable cutting blades which are shown in FIGS. 1 and 2 in different phases of the cutting process. A total of three stationary shearing blades 2, 3 and 4 are provided which, with their shearing edges 6, 7 and 8, are located uniformly in one plane, namely the cutting plane 5. The stationary shearing blades at the same time form the clamping jaws of the clamping device for the rectangular tube 1 to be cut. The lower clamping jaw 9 is L-shaped with the lower beam-shaped shearing blade 3 and the cross blade leg 4 fastened on it. The shearing edge 8 of cross blade leg 4 is directed vertically. The upper shearing blade 2 which is parallel to the lower shearing blade 3 has the shape of a beam. This shearing blade is also the movable clamping jaw of the clamping device and is connected with a clamping drive which will be explained below. In order to be able to clamp the rectangular pipe 1 to be cut diagonally between the two plane surfaces of the upper and the lower shearing blades that face one another, the cross blade leg is wedge-shaped in a horizontal section having a wedge angle 10 that is smaller than a right angle. The wedge angle 10 is as large as the largest angle of slope to be cut for a rectangular tube. The shearing edges 6, 7, and 8 of the shearing blades abut without gaps and enclose the rectangular tube to be cut on three circumferential sides. The upper and the lower shearing blade 2 and 3 rest against the two opposite circumferential sides of the rectangular pipe 1. A large area of the corresponding plane surfaces of the shearing blades, rest against these sides of the pipe and the shearing blades are pressed onto the rectangular tube with the clamping force of the driving device for the clamping arrangement. All stationary shearing blades are located on the workpiece side of the cutting plane 5.

A movable shearing blade 11 is movably guided over the shearing plane 5, and the movable shearing blade 11 touches the stationary shearing blades 2, 3 and 4. The movable shearing blade 11 has a movable shearing edge 12 also located in the cutting plane 5. However, the movable shearing blade extends only on the side of the cutting plane that faces away from the workpiece 1. The movable shearing blade is also wedge-shaped in a horizontal section, and thus is wedge-shaped in a cross-section transverse to the clamping direction 41 through the shearing edge 12. At no point of the shearing edge 12 is the wedge angle that is visible in such a horizontal section larger than the wedge angle 10 of the cross blade leg 4. This is to ensure that the shearing edge 12 of the movable shearing blade 11 can dip into the base of a pocket-shaped projecting part of the rectangular tube to be cut. The corresponding wedge shape of the movable shearing blade is produced by a beveling 17 taking place along the cutting contour.

In order to be able to shear off the end of the rectangular tube clamped in between the two shearing blades 2 and 3, protruding in the direction of the movable cutting blade, the movable shearing edge 12, from the direction of the interior of the rectangular profile, is guided with at least one moving component over each of the three stationary shearing edges. This can be achieved by the contour of the shearing edge of the movable shearing blade or the movement of the shearing blade in the cutting plane 5. For this purpose, either a shearing blade that can be swivelled or a shearing blade that is moved on a curved path in parallel to itself would be possible. However, an especially simple and stable guiding of the movable shearing blade 11 is achieved by a straight course of the shearing blade guiding. In the shown embodiment, the shearing blade is guided in parallel to the two horizontal shearing blades 2 and 3, and the moving direction 19 is obtained during the cutting. In order to be able, despite this one-dimensional movement of the movable shearing blade, to sweep over all three stationary shear edges 6, 7 and 8 with at least one moving component, the shearing edge 12 of the movable shearing blade has a V-shaped contour and is swept back with a tip 16 preceding in the cutting direction.

Basically, it would also be conceivable to clamp in the rectangular tube 1, as in customary conventional miter cutting devices, at the vertically upright side surfaces or the circumferential surfaces between the cross blade leg 4 and a movable clamping jaw that is horizontally opposite the cross blade leg. However, this would have the disadvantage that for each miter square to be cut, a wedge-shaped intermediate piece having the fitting wedge angle would have to be inserted. In order to avoid this expenditure, the shown embodiment provides a clamping of the workpiece in parallel to a horizontal clamping plane 15 with a vertical clamping direction 41 of the movable clamping jaw (upper shearing blade 2). The clamping plane 15 is defined by the workpiece axis 13 and a normal line 14 onto the cutting plane which is located at the level of the workpiece axis 13. Because of the clamping of the workpiece in parallel to a horizontal plane, the workpiece can be placed in the cutting device in one step under any arbitrary angle of slope relative to the cutting plane 5, ad the workpiece can be clamped without the requirement of additional clamping wedges or similar means.

In order to provide the movable shearing blade, in the area of the shearing edge point, with the best possible lateral guiding and lateral support, the cutting edge contour tapers off in an arched manner from the ends of the straight shearing edge sections 12. The bend of the arch is concave toward the front and forms a so-called breaking shoulder 18 for sheared-off chips. In the area of the upper and lower longitudinal side of the shearing blade body, the shearing blade body projects toward the front into at least the area of the end of the straight shearing edge sections, and thus causes a secure lateral support of the shearing blade body in this area. At the same time, an unimpaired removal of the sheared-off material toward the rear is ensured.

In order to be able to also cut very small rectangular profiles by means of this cutting arrangement, the point 16 of the V-shaped swept-back movable shearing edge 12 is arranged eccentrically at the shearing blade 11, i.e., the point is directed toward the stationary clamping jaw 9, outside the center of the shearing blade. In addition, the parts of the shearing edges that are located on both sides of the shearing edge point are sloped with a different sweepback angle 20 and 21 resulting in shearing edge sections that have approximately the same length and have the measurements l and l' at both sides of the points. The vertical distance a between the swept-back point 16 and the lower shearing edge 7 is smaller than the smallest rectangular profile height h that is to be cut on the cutting arrangement. As a result, when relatively small rectangular profiles are cut, the point of the movable shearing blade can still dip into the pocket-shaped projecting part of the diagonally clamped-in rectangular tube and can shear off this projecting part from the side against the stationary shearing edges.

Figure 3:
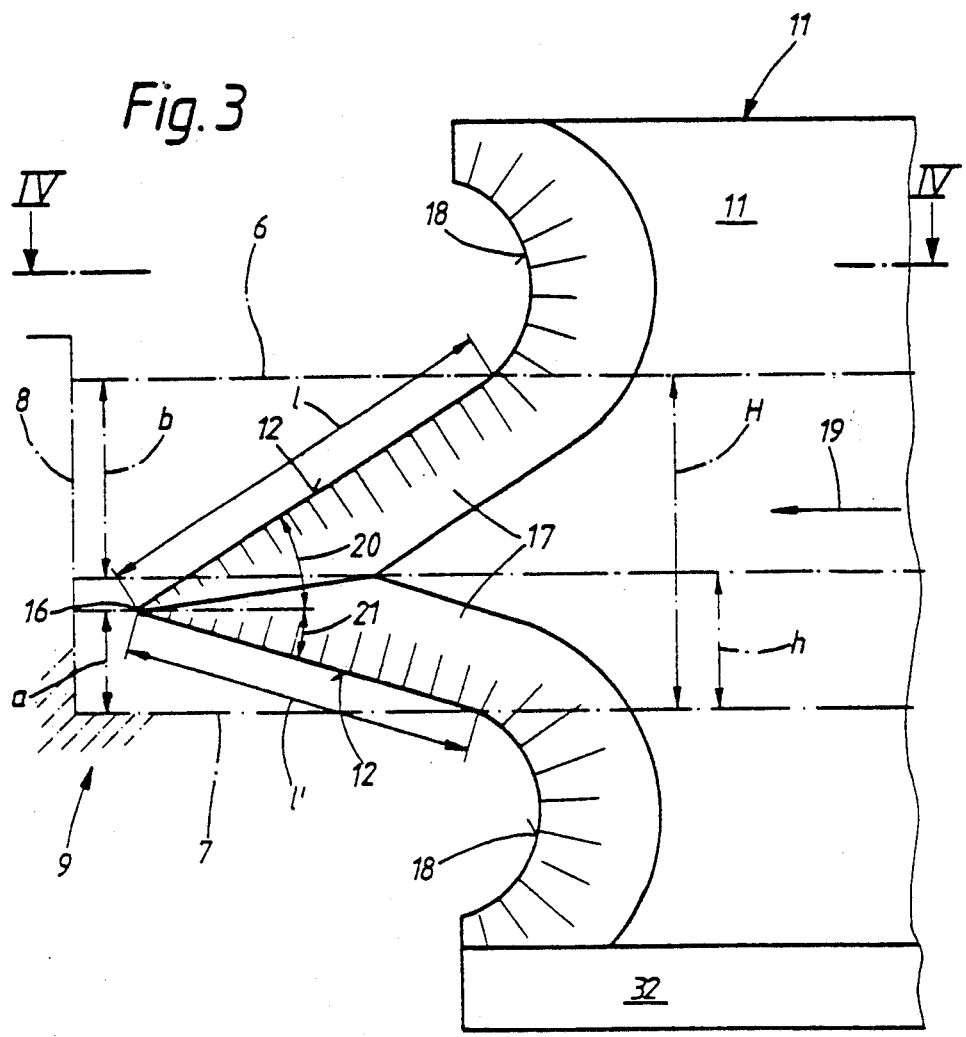
FIG. 3 is a side view of the movable shearing blade.
Figure 4:
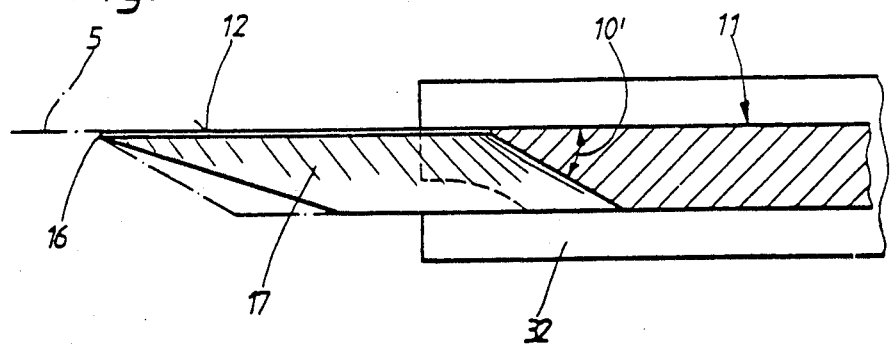
FIG. 4 is a cross-section through the movable shearing blade according to FIG. 3 along the cutting line IV-IV.
Figure 5A:
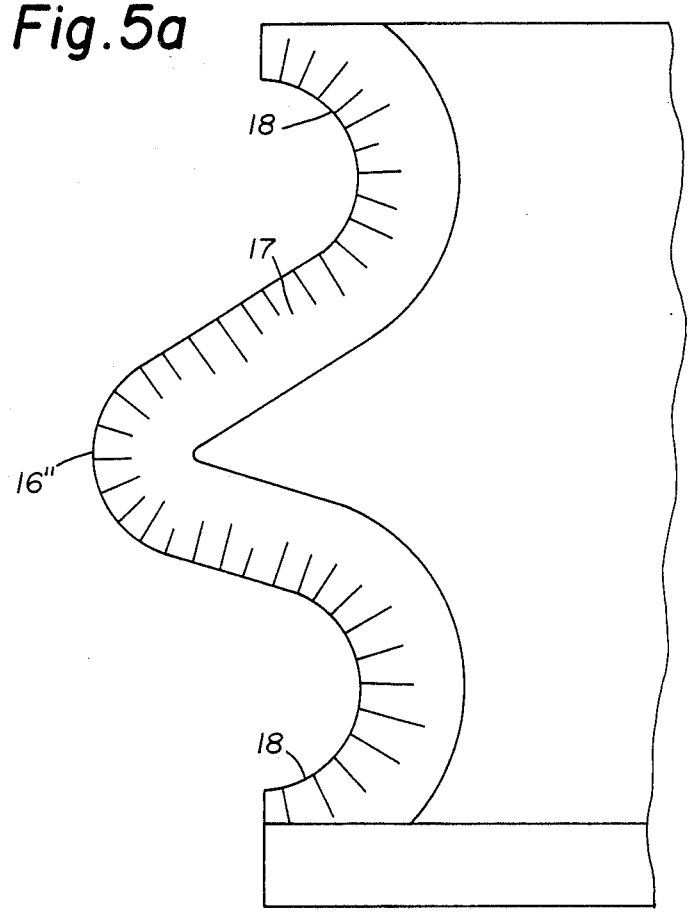
FIG. 5a is a side view of another embodiment of the movable shearing blade.

In the embodiment according to FIGS. 3 and 4, a relatively sharp point 16 is provided at the swept-back part of the movable cutting edge 12, resulting in a relatively slender blade point. It is true that this point can dip relatively deeply into the pocket-shaped projecting part of the diagonally clamped-in rectangular tube, but this type of slender blade point can also break off more easily. As shown in FIG. 5, this can especially occur when the wall thickness s of the rectangular tube is larger, for example, 3 mm or more. In order to reduce this danger of breakage, the shearing edge point 16', according to the modified embodiment of the movable shearing blade 11' shown in FIG. 5, is rounded (rounding radius r). In addition to the shearing edge 12 itself being rounded, the pertaining wedge-shaped shearing blade beveling 17 is rounded, resulting in a wedge-shaped cross-section in the horizontal cut of the shearing blade at all points of the shearing edge. Therefore, in the area of the shearing edge point 16', the shearing blade practically forms a cone. Instead of a circular shearing edge contour, a polygon-type shape may also be provided (FIG. 5a). Instead of a cone, a corresponding many-sided pyramid 16" would then be obtained in the area of the shearing edge point. Although the shearing edge point is less slender, a shearing edge point of this type can still exercise the required shearing cut with respect to the vertically extending wall section of the rectangular tube. The rounding radius r of the circular shearing edge is about 50 to 70% smaller than the profile height h' of the smallest rectangular tube to be cut. When a polygon shaped shearing edge is employed, the radius of a circle which would enclose the polygon and which would touch each point of the polygon is about 50 to 70% smaller than the profile height h' of the smallest rectangular tube to be cut. When the smallest rectangular profile is clamped in, the curvature radius, with respect to the size and the relative position to the shearing edges, is to be selected in such a way that the stationary shearing edges 6 and 7 cut the movable shearing edge 12 at an acute angle. The vertical distance a' of the shearing edge point 16' with respect to the stationary shearing edge 7 also influences the size of the mentioned intersecting angle.

Figure 7:
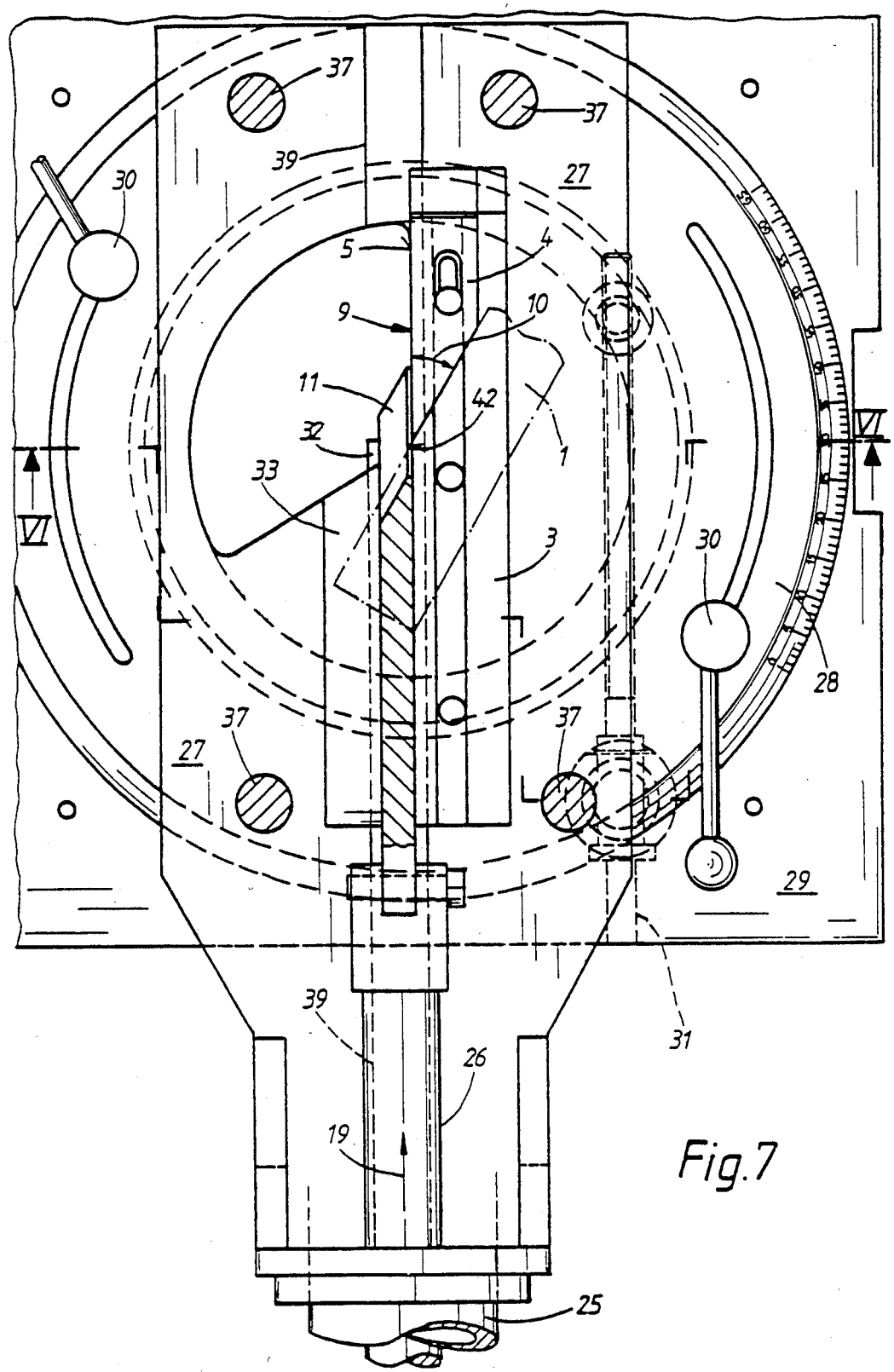
FIG. 7 is a top view of the shearing device arrangement.

FIGS. 6 and 7 which must be arranged with respect to one another according to FIG. 8, show the constructive development of the cutting arrangement. A base plate 27 is fastened on a base frame 29 directly by means of an inserted graduated disk 28. The stationary shearing blades 2, 3 and 4 and the movable shearing blade 11, including the pertaining clamping and cutting drive 23 and 25, are arranged on the base plate. A workpiece contact rail 38 is fastened at the base frame 29 in a stationary manner. The upper edge of the workpiece contact rail is located at the same level as the cutting edge 7 and the horizontal upper side of the lower blade 3. In order to be able to adjust different angles of slope with respect to the placed workpiece, the base plate 27 with all parts arranged on it, can be swivelled relative to the workpiece contact rail 38 around a swivel axis 42 that is vertical to the clamping plane 15. In order to prevent a horizontal shifting of the vertically upright shearing edge 8 of the cross blade leg 4 relative to the workpiece contact rail 38 when the base plate 27 is swivelled, the swivel axis 42 has the same axis as the mentioned shearing edge 8 of the cross blade leg.

The base plate 27 is rigidly connected with the graduated disk 28, and the graduated disk 28 is disposed on the base frame 29 so that it can be rotated around the swivel axis 42. The graduated disk 28 itself, by means of two clamping screws 30, can be locked in the desired angular position on the base frame 29. In order to be able to swivel the relatively heavy structure sensitively into the desired angular position, a swivelling spindle drive 31 is provided between the base frame 29 or the graduated disk 28.

A cover plate 36 is held by means of four guiding columns 37 in parallel to the base plate 27, and the cover plate 36 itself carries the clamping cylinder 23 with the piston rod 24. A horizontally aligned clamping plate 35 is vertically movably guided on the guiding columns 37. The clamping plate 35 can be shifted by means of the clamping cylinder. The upper blade 2 is rigidly connected with the clamping plate 35. Said upper blade 2 also represents the upper movable clamping jaw. The lower stationary clamping jaw which is formed by the lower blade 3 and the cross blade leg 4 is firmly connected with the base plate 27.

For the guiding of the movable blade 11, the blade is screwed to a guiding strip 32 engaging in a corresponding guiding groove 39 in the base plate 27. The groove passes through the whole length of the base plate. This guiding strip is used for the dispersal of working forces that are directed vertically downward to be absorbed by the base plate. However, at the same time, working forces that are directed vertically upward and affect the movable blade, via the upper side of the guiding strip and the lower blade 3 as well as another guiding strip 33, are to be transferred indirectly into the base plate 27. Working forces that are horizontal and are directed away from the cutting plane 5 and affect the movable cutting blade are taken over by corresponding additional guiding strips 33 and 34 that are worked into the base plate 27 and the clamping plate 35. Working forces that affect the movable shearing blade in the direction of the cutting plane 5 are absorbed directly by the stationary shearing blades 2, 3 and 4 themselves. In order to clamp large profile heights H as well as small profile heights having a height h and h', and in order to be able to cover a certain clamping range b by means of the clamping device, a groove-type blade shaft 40 is provided in the clamping plate 35. The groove-type blade shaft is located in alignment with the movable shearing blade 11. When smaller rectangular profiles are clamped, the upper side of the movable shearing blade can dip into the blade shaft.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A device for shearing the end of a tube comprising:
   a clamping device means for clamping a tube, said clamping device having a clamping force direction; and
   shearing means including two swept-back tapering shearing edges, all cross-sections through said shearing edges being wedge-shaped, said clamping device means and said shearing means movable relative to one another, for shearing the tube in a shearing plane along a shearing force direction transverse to the clamping force direction;
   wherein rectangular tubes are sheared and said clamping device surrounding the tubes on three circumferential sides and clamping power of said clamping device means is provided on two opposite circumferential sides of the tube, said clamping device means including clamping jaws having contact surfaces in planes perpendicular to the clamping axis, said clamping jaws having shearing edges disposed in the shearing plane, one clamping jaw being L-shaped and another clamping jaw being a straight beam.

2. A device as in claim 1, wherein the two swept-back shearing edges are straight and ends of the straight shearing edges taper off into arch-shaped contours, said arch-shape contours being concave toward the tube to be sheared.

3. A device as in claim 2, wherein said swept-back tapering shearing edges form a point on ends opposite said arch-shaped contours.

4. A device as in claim 3, wherein the wedge-shaped cross-sections of the shearing means shearing edges are rounded, said rounded edges having a curvature radius 50–70% shorter than the height of the predetermined smallest rectangular tube to be cut.

5. A device as in claim 3, wherein the wedge-shaped cross-sections of the shearing means shearing edges are polygonal-shaped, wherein a circle which would enclose the polygon edge and which would touch each point of the polygon has a radius about 50–70% smaller than the profile height h' of the predetermined smallest rectangular tube to be cut.

6. A device as in claim 3, wherein one clamping jaw remains stationary and another clamping jaw is movable, said shearing edge point being eccentric to the shearing axis toward the stationary clamping jaw.

7. A device as in claim 6, wherein one swept-back edge of the movable shearing device has a swept-back angle from the shearing edge point greater than the other swept-back edge angle, said swept-back edges having approximately equal straight edges.

8. A device as in claim 7, wherein the distance between the edge point and the stationary jaw is shorter than the shortest rectangular tube to be cut on said device.

9. A device as in claim 8, wherein the L-shaped jaw has a straight beam section parallel to said straight beam clamping jaw and has a cross leg section having a first end facing the edge point of the shearing means, said first end of the cross leg section having a wedge-shape in all cross-sectional planes perpendicular to said shearing plane, wherein said first end of said cross leg section comprises a shearing edge perpendicular to the shearing edges of the straight beam jaw and the straight beam section of the L-shaped jaw.

10. A device as in claim 9, wherein the angle of the wedge formed from the first end of the cross leg section corresponds to the largest angle to be cut in the tube.

11. A device as in claim 10, wherein the clamping jaws hold the tube in a defined axial and annular position relative to the cutting plane.

12. A device as in claim 11, wherein one end of the straight beam jaw has a wedge-shaped end facing said cross beam leg, said wedge-shaped end having a wedge-shape equal to the wedge angle of the cross leg section wedge-angle, wherein said wedge-shaped end of the straight beam jaw slidably contacts the wedge-shaped end of the cross leg section of the L-shaped jaw.

13. A device as in claim 12, wherein the L-shaped clamping jaw is the stationary clamping jaw and wherein the straight beam clamping jaw is the movable clamping jaw.

14. A device as in claim 13, including:
a clamping drive;
a cutting drive;
a workpiece contact rail; and
a base plate, wherein the clamping jaws and the shearing means and the clamping and the cutting drive, are arranged on the base plate, said base plate can be swivelled relative to the workpiece contact rail around a swivel axis located parallel to the clamping force direction.

15. A device as in claim 14, wherein the swivel axis coincides approximately with the shearing edge of the cross leg section.

16. A device as in claim 15, including a dispersing means for dispersing working forces from the movable shearing device into the stationary clamping jaw and for dispensing working forces from the stationary clamping jaw into the shearing means.

* * * * *

UNITED STATES PATENT AND TRADEMARK OFFICE
CERTIFICATE OF CORRECTION

PATENT NO. : 4,653,370
DATED : March 31, 1987
INVENTOR(S) : Hans Baudisch, Lampertheim, and Hans Schultheis, Biblis It is certified that error appears in the above-identified patent and that said Letters Patent is hereby corrected as shown below: Figure 5a should appear as shown below:

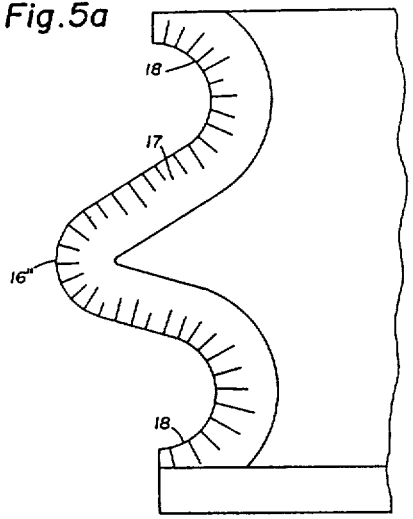

Signed and Sealed this

Thirteenth Day of October, 1987

Attest:

DONALD J. QUIGG

Attesting Officer

Commissioner of Patents and Trademarks